United States Patent
Kitade et al.

(10) Patent No.: US 10,676,606 B2
(45) Date of Patent: Jun. 9, 2020

(54) METHACRYLIC RESIN COMPOSITION AND INJECTION-MOLDED ARTICLE

(71) Applicant: KURARAY CO., LTD., Kurashiki-shi (JP)

(72) Inventors: Yasuhito Kitade, Tainai (JP); Hiroshi Ozawa, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 42 days.

(21) Appl. No.: 16/079,420

(22) PCT Filed: Feb. 23, 2017

(86) PCT No.: PCT/JP2017/006920
§ 371 (c)(1),
(2) Date: Aug. 23, 2018

(87) PCT Pub. No.: WO2017/146169
PCT Pub. Date: Aug. 31, 2017

(65) Prior Publication Data
US 2019/0048181 A1    Feb. 14, 2019

(30) Foreign Application Priority Data

Feb. 26, 2016  (JP) ................... 2016-035726

(51) Int. Cl.
| | | |
|---|---|---|
| *C08L 33/12* | (2006.01) | |
| *C08F 220/14* | (2006.01) | |
| *C08F 220/06* | (2006.01) | |
| *C08F 220/18* | (2006.01) | |
| *C08L 33/08* | (2006.01) | |

(52) U.S. Cl.
CPC ............ *C08L 33/12* (2013.01); *C08F 220/06* (2013.01); *C08F 220/14* (2013.01); *C08F 220/18* (2013.01); *C08L 33/08* (2013.01); *C08F 2500/01* (2013.01); *C08F 2500/03* (2013.01)

(58) Field of Classification Search
CPC ................................ C08L 33/12; C08F 220/14
See application file for complete search history.

(56) References Cited

U.S. PATENT DOCUMENTS

| 5,726,245 A | 3/1998 | Numrich et al. |
|---|---|---|
| 2015/0148508 A1 | 5/2015 | Niimura et al. |
| 2016/0053062 A1 | 2/2016 | Maeda et al. |
| 2017/0183428 A1* | 6/2017 | Nakahara ............... C08F 20/18 |

FOREIGN PATENT DOCUMENTS

| JP | 6-166714 A | 6/1994 |
|---|---|---|
| JP | 9-176432 A | 7/1997 |
| JP | 2008-189902 A | 8/2008 |
| JP | 2009-215367 A | 9/2009 |
| JP | 2012-214618 A | 11/2012 |
| JP | 2012-214619 A | 11/2012 |
| JP | 2014-108988 A | 6/2014 |
| WO | WO 2013/161265 A1 | 10/2013 |
| WO | WO 2014/167868 A1 | 10/2014 |
| WO | WO 2016/002750 * | 1/2016 |

OTHER PUBLICATIONS

International Search Report dated May 23, 2017 in PCT/JP2017/006920 filed Feb. 23, 2017.

* cited by examiner

*Primary Examiner* — Jeffrey C Mullis
(74) *Attorney, Agent, or Firm* — Oblon, McClelland, Maier & Neustadt, L.L.P.

(57) ABSTRACT

A methacrylic resin composition comprising not less than 90% by mass of a methacrylic resin, wherein the methacrylic resin comprises 95 to 100% by mass of methyl methacrylate monomer units and 0 to 5% by mass of acrylate monomer units, the methacrylic resin has an Mw of 57000 to 90000, Mw representing a weight-average molecular weight, and a ratio Mw/Mn of not more than 1.9, Mn representing a number-average molecular weight, the methacrylic resin composition has an absolute value of a difference between YI4 and YI2 of not more than 3, YI4 representing a yellow index at an optical path length of 200 mm of an injection-molded article obtained at a cylinder temperature of 280° C. in a molding cycle of 4 minutes, YI2 representing a yellow index at an optical path length of 200 mm of an injection-molded article obtained at a cylinder temperature of 280° C. in a molding cycle of 2 minutes, and meets a relationship represented by Formula (B) and Formula (C):

$$R \geq 11 \quad \text{Formula (B)}$$

$$0.8 < R/E < 1.2 \quad \text{Formula (C)}$$

where R represents the melt flow rate of the methacrylic resin composition as measured at 230° C. under a load of 3.8 kg, the melt flow rate R being expressed in g/10 min; and E represents a value calculated by Formula (A), the value E being expressed in g/10 min, the Formula (A) being $E = \exp(0.17112 \times W - 0.00399 \times P + 5.09713)$ where W represents the ratio of acrylate monomer units to the total monomer units in the methacrylic resin, the ratio W being expressed in % by mass; and P represents the degree of polymerization of the methacrylic resin.

7 Claims, No Drawings

METHACRYLIC RESIN COMPOSITION AND INJECTION-MOLDED ARTICLE

TECHNICAL FIELD

The present invention relates to a methacrylic resin composition and an injection-molded article, and a production method thereof. More specifically, the present invention relates to a methacrylic resin composition that during heat forming, has excellent flowability and is less likely to be colored and an injection-molded article that has high heat resistance and high mechanical strength, and a production method thereof.

BACKGROUND ART

Methacrylic resins have high transparency and are useful as the materials of molded articles used as optical members, lighting members, sign members, decoration members, and the like. There is a demand to lighten or thin shaped products in some fields in which methacrylic resin shaped products are being used. To obtain thin shaped products, the methacrylic resin is required to have high flowability when melted. As commonly known methods for increasing the flowability of a resin include, mentioned can be lowering the softening temperature or glass-transition temperature, reducing the molecular weight, widening the molecular weight distribution or the like. However, application of these methods to a methacrylic resin would cause reductions in heat resistance, reductions in mechanical strength, or the like. Patent literatures 1 to 4 propose various methacrylic resin production methods considering the foregoing.

CITATION LIST

Patent Literature

Patent Literature 1: JP 2012-214618 A
Patent Literature 2: JP 2012-214619 A
Patent Literature 3: WO 2013/161265 A1
Patent Literature 4: JP 2014-108988 A

SUMMARY OF INVENTION

Problems to be Solved by the Invention

An object of the present invention is to provide a methacrylic resin composition that during heat forming, has high flowability and is less likely to be colored and an injection-molded article that has high heat resistance and high mechanical strength, and a production method thereof.

Means for Solving the Problems

The present inventors have considered a method to solve the above problems and then found that the object can be accomplished if a methacrylic resin composition comprises not less than 90% by mass of a methacrylic resin; the methacrylic resin comprises 95 to 100% by mass of methyl methacrylate monomer units and 0 to 5% by mass of acrylate monomer units; and the melt flow rate (MFR) of the methacrylic resin composition satisfies at least certain relationships with the proportion of the acrylate monomer units of the methacrylic resin comprised in the methacrylic resin composition and the degree of polymerization of the methacrylic resin. The present inventors have further considered a method for solving the problems on the basis of this finding and finally completed the present invention including the following aspects.

That is, the present invention includes the following aspects.

[1] A methacrylic resin composition comprising not less than 90% by mass of a methacrylic resin, wherein the methacrylic resin comprises 95 to 100% by mass of methyl methacrylate monomer units and 0 to 5° by mass of acrylate monomer units, the methacrylic resin has an Mw of 57000 to 90000, Mw representing a weight-average molecular weight, and a ratio Mw/Mn of not more than 1.9, Mn representing a number-average molecular weight, and the methacrylic resin composition has an absolute value of a difference between YI4 and YI2 of 3 or less, YI4 representing a yellow index at an optical path length of 200 mm of an injection-molded article obtained at a cylinder temperature of 280° C. in a molding cycle of 4 min, YI2 representing a yellow index at an optical path length of 200 mm of an injection-molded article obtained at a cylinder temperature of 280° C. in a molding cycle of 2 min, and meets a relationship represented by Formula (B) and Formula (C):

$$R \geq 11 \qquad \text{Formula (B)}$$

$$0.8 < R/E < 1.2 \qquad \text{Formula (C)}$$

where R represents the melt flow rate of the methacrylic resin composition as measured at 230° C. under a load of 3.8 kg, the melt flow rate R being expressed in g/10 min; and E represents a value calculated using Formula (A), the value E being expressed in g/10 min, the Formula (A) being $E = \exp(0.17112 \times W - 0.00399 \times P + 5.09713)$ where W represents the ratio of acrylate monomer units to the total monomer units in the methacrylic resin, the ratio W being expressed in % by mass; and P represents the degree of polymerization of the methacrylic resin.

[2] An injection-molded article composed of the methacrylic resin composition according to the aspect [1].

[3] A board composed of the methacrylic resin composition according to the aspect [1] and having a thickness of not more than 1 mm.

[4] A method for producing the methacrylic resin composition according to the aspect [1], comprising bulk-polymerizing a monomer mixture comprising methyl methacrylate monomer and an acrylate monomer.

[5] A method for producing an injection-molded article, comprising injection-molding a methacrylic resin composition, wherein the methacrylic resin composition comprises not less than 90% by mass of a methacrylic resin, the methacrylic resin comprises 95 to 100% by mass of methyl methacrylate monomer units and 0 to 5% by mass of acrylate monomer units, the methacrylic resin has an Mw of 57000 to 90000, Mw representing a weight-average molecular weight, and a ratio Mw/Mn of not more than 1.9, Mn representing a number-average molecular weight, the methacrylic resin composition has an absolute value of a difference between YI4 and YI2 of not more than 3, YI4 representing a yellow index at an optical path length of 200 mm of an injection-molded article obtained at a cylinder temperature of 280° C. in a molding cycle of 4 minutes, YI2 representing a yellow index at an optical path length of 200 mm of an injection-molded article obtained at a cylinder temperature of 280° C. in a molding cycle of 2 minutes, and meets a relationship represented by Formula (B) and Formula (C):

$$R \geq 11 \qquad \text{Formula (B)}$$

$$0.8 < R/E < 1.2 \qquad \text{Formula (C)}$$

where R represents the melt flow rate of the methacrylic resin composition as measured at 230° C. under a load of 3.8 kg, the melt flow rate R being expressed in g/10 min; and E represents a value calculated by Formula (A), the value E being expressed in g/10 min, Formula (A) being E=exp (0.17112×W−0.00399×P+5.09713) where W represents the ratio of acrylate monomer units to the total monomer units in the methacrylic resin, the ratio W being expressed in % by mass; and P represents the degree of polymerization of the methacrylic resin.

Advantageous Effects of the Invention

The methacrylic resin composition of the present invention has excellent flowability and is less likely to cause molding defects such as silver streaks, cracks, sink marks, flow marks, resin burning, gas contamination, or coloring. The methacrylic resin composition of the present invention is also suitable for injection molding. The methacrylic resin composition of the present invention is also suitable for obtaining a thin shaped product, for example, a board having a thickness of 1 mm or less. A shaped product formed of the methacrylic resin composition of the present invention has high heat resistance and high mechanical strength and has no appearance defect such as coloring. The methacrylic resin composition of the present invention generates low shear heat when injection-molded and can be injection-molded even at low temperature and high injection pressure. Thus, a shaped product having good appearance is obtained.

Embodiments for Carrying Out the Invention

A methacrylic resin composition of the present invention comprises a methacrylic resin. The content of the methacrylic resin in the methacrylic resin composition of the present invention is not less than 90% by mass, preferably 90 to 99.9% by mass, more preferably 90 to 99.5% by mass.

A methacrylic resin used in the present invention comprises methyl methacrylate monomer units and optionally acrylate monomer units.

The content of the methyl methacrylate monomer units is 95 to 100% by mass, preferably 95 to 98% by mass, more preferably 95 to 96% by mass. The content of the acrylate monomer units is 0 to 5% by mass, preferably 2 to 5% by mass, more preferably 4 to 5% by mass.

When the content of the methyl methacrylate monomer units falls within the above range, an injection-molded article having a low yellow index (YI4) at an optical path length of 200 mm is obtained at a cylinder temperature of 280° C. in a molding cycle of 4 minutes, and the methacrylic resin is less likely to be colored by heat during shape forming.

Examples of acrylate monomers include alkyl acrylates such as methyl acrylate, ethyl acrylate, n-propyl acrylate, isopropyl acrylate, n-butyl acrylate, isobutyl acrylate, t-butyl acrylate, pentyl acrylate, hexyl acrylate, octyl acrylate, 2-ethylhexyl acrylate, cyclohexyl acrylate, dodecyl acrylate, myristyl acrylate, palmityl acrylate, stearyl acrylate, and behenyl acrylate; aryl acrylates such as phenyl acrylate; and aralkyl acrylates such as benzyl acrylate. Among these, alkyl acrylates are preferred. The carbon number of an alkyl group of an alkyl acrylate is preferably 1 to 8, more preferably 1 or 2, even more preferably 1.

The methacrylic resin used in the present invention has a weight-average molecular weight Mw of 57000 to 90000, preferably 70000 to 85000, more preferably 70000 to 79000. When the weight-average molecular weight exceeds the above range, the melt flow rate of the methacrylic resin composition tends to decrease, making it difficult to obtain a thin injection-molded article. On the other hand, When the weight-average molecular weight falls below the above range, a mechanically less strong or brittle shaped product may be obtained, and such a shaped product is more likely to be broken, for example, when taken out of the mold.

The methacrylic resin used in the present invention has a ratio of the weight-average molecular weight Mw to the number-average molecular weight Mn, Mw/Mn, of 1.9 or less, preferably 1.7 or more and 1.8 or less. Even if the weight-average molecular weight falls within the above range, if Mw/Mn exceeds 1.9 due to, for example, a high proportion of polymer components having low molecular weights, a brittle, low-surface hardness shaped product would tend to be obtained. The weight-average molecular weight Mw and the number-average molecular weight Mn are values determined by converting a chart measured by gel permeation chromatography into the molecular weight of a standard polymethyl methacrylate.

The production method of the methacrylic resin used in the present invention isn't especially limited. For example, it may be produced by known polymerization reaction such as radical polymerization reaction or anionic polymerization reaction. A methacrylic resin having a desired characteristic value (e.g., weight-average molecular weight) can be obtained by modulating a polymerization condition, for example, by conditioning the polymerization temperature, polymerization time, the type or amount of the chain transfer agent, or the type or amount of the polymerization initiator.

Radical polymerization reaction is preferably used when producing the methacrylic resin. A method for using radical polymerization reaction can be selected from suspension polymerization method, bulk polymerization method, solution polymerization method, and emulsion polymerization method. Among these polymerization methods, bulk polymerization method is preferred since less impurities are mixed. Bulk polymerization method is preferably performed in a continuous flow manner.

The method for producing the methacrylic resin used in the present invention preferably involves bulk-polymerizing a monomer mixture comprising methyl methacrylate monomers and optionally acrylate monomers. An increase in the usage of acrylate monomers tends to cause an increase in the flowability of the methacrylic resin composition of the present invention and thus an increase in the melt flow rate R. A reduction in the usage of acrylate monomers tends to cause a reduction in the absolute value of ΔYI. However, an excessive reduction in the usage of acrylate monomers is more likely to cause pyrolysis of the methacrylic resin composition of the present invention and thus a reduction in the heat resistance thereof, resulting in an increase in the absolute value of ΔYI.

When causing polymerization reaction, a polymerization initiator, predetermined monomers, and optionally a chain transfer agent or the like are used. The polymerization temperature is preferably 100 to 150° C., more preferably 120 to 140° C. Lowering the polymerization temperature to a greater extent tends to cause a greater increase in the heat resistance and a greater increase in the absolute value of ΔYI of the methacrylic resin composition of the present invention. Reducing the amount of polymerization initiator and increasing the amount of chain transfer agent to a greater extent tends to cause a greater reduction in the absolute value of $\Delta YI$ of the methacrylic resin composition of the present invention.

The polymerization initiator used in the present invention is not limited. Examples thereof can include azo polymerization initiators such as azobisisobutyronitrile and the like; peroxide polymerization initiators such as t-Hexyl peroxy isopropyl monocarbonate and the like. The polymerization initiator used in the present invention preferably has a half-life period of 1 second to 1 minute at the polymerization temperature. Use of the polymerization initiator in a slightly small amount tends to reduce the absolute value of $\Delta YI$ of the methacrylic resin composition of the present invention. To reduce the absolute value of $\Delta YI$, azobisisobutyronitrile, for example, is used preferably in an amount of not more than 0.02 part by mass, more preferably not less than 0.002 part by mass and not more than 0.01 part by mass with respect to a total of 100 parts by mass of the monomers.

The chain transfer agent used in the present invention is not limited. Examples thereof can include mercaptan chain transfer agents such as n-octyl mercaptan, n-dodecyl mercaptan and the like; α-methyl styrene dimer; terpinolene and the like. Use of the chain transfer agent in a slightly large amount tends to cause a reduction in the absolute value of $\Delta YI$ of the methacrylic resin composition of the present invention and an increase in the flowability thereof. To reduce the absolute value of $\Delta YI$ and increase the flowability, n-octyl mercaptan, for example, is used preferably in an amount of not less than 0.3 part by mass and not more than 0.6 part by mass, more preferably in an amount of not less than 0.41 part by mass and not more than 0.55 part by mass with respect to a total of 100 parts by mass of the monomers.

The methacrylic resin composition of the present invention may contain an additive such as an antioxidant, heat deterioration inhibitor, ultraviolet absorber, light stabilizer, lubricant, mold release, polymer processing aid, antistat, flame retardant, dye/pigment, light diffusion agent, organic dye, delustrant, impact resistance modifier, fluorescent material, or the like, in the extent that the effects of the present invention are not impaired.

An antioxidant has an effect of singly preventing oxidative degradation of a resin in the presence of oxygen. Examples thereof can include phosphorus antioxidants, hindered phenol antioxidants, thioether antioxidants and the like. To prevent degradation of optical characteristics due to coloring, use of a phosphorus antioxidant or hindered phenol antioxidant is preferred, and combined use of a phosphorus antioxidant and a hindered phenol antioxidant is more preferred.

If a phosphorus antioxidant and a hindered phenol antioxidant are used in combination, the mass ratio of the phosphorus antioxidant to the hindered phenol antioxidant is preferably from 0.2/1 to 2/1, more preferably from 0.5/1 to 1/1.

Examples of phosphorus antioxidants can include
2,2-methylenebis(4,6-di-t-butylphenyl)octyl phosphite (trade name: ADK STAB HP-10 available from ADEKA CORPORATION),
tris(2,4-di-t-butylphenyl)phosphite (trade name: IRUGAFOS168 available from BASF SE), and
3,9-bis(2,6-di-t-butyl-4-methylphenoxy)-2,4,8,10-tet raoxa-3,9-diphosphaspiro[5.5]undecane (trade name: ADK STAB PEP-36 available from ADEKA CORPORATION).

Preferred hindered phenol antioxidants can include pentaerythrityl-tetrakis[3-(3,5-di-t-butyl-4-hydroxy phenyl)propionate] (trade name: IRGANOX1010 available from BASF SE) and octadecyl-3-(3,5-di-t-butyl-4-hydroxyphenyl)propionate (trade name: IRGANOX1076 available from BASF SE).

A heat deterioration inhibitor is able to prevent heat deterioration of a resin by trapping polymer radicals generated when the resin is subjected to high heat in a substantial oxygen-free state.

As heat deterioration inhibitors, preferred are 2-t-butyl-6-(3'-t-butyl-5'-methyl-hydroxybenzyl)-4-methylphenyl acrylate (trade name: Sumilizer GM available from Sumitomo Chemical Company, Limited), 2,4-di-t-amyl-6-(3',5'-di-t-amyl-2'-hydroxy-α-methyl benzyl)phenyl acrylate (trade name: Sumilizer GS available from Sumitomo Chemical Company, Limited) and the like.

An ultraviolet absorber is a compound having an ability to absorb ultraviolet rays and is said to have a main function of converting light energy into heat energy.

Examples of ultraviolet absorbers can include benzophenones, benzotriazoles, triazines, benzoates, salicylates, cyanoacrylates, oxalic anilides, malonic esters, formamidines and the like. Among these, benzotriazoles and triazines are preferred. Ultraviolet absorbers having a maximum molar absorptivity $\varepsilon_{max}$ of 100 dm$^3 \cdot$mol$^{-1}$ cm$^{-1}$ or less at a wavelength of 380 to 450 nm are also preferred.

Benzotriazoles have a function of significantly suppressing reductions in optical characteristics, such as coloring caused by ultraviolet exposure and therefore are used as preferred ultraviolet absorbers when shaped products of the present invention are used in optical applications. As benzotriazoles, preferred are 2-(2H-benzotriazole-2-yl)-4-(1,1,3,3-tetramethyl butyl)phenol (trade name: TINUVIN329 available from BASF SE), 2-(2H-benzotriazole-2-yl)-4,6-bis(1-methyl-1-phenylethyl)phenol (trade name: TINUVIN234 available from BASF SE), 2,2'-methylenebis[6-(2H-benzotriazole-2-yl)-4-t-octyl phenol] (LA-31 available from ADEKA CORPORATION) and the like.

An ultraviolet absorber having a maximum molar absorptivity $\varepsilon_{max}$ of 1200 dm$^3 \cdot$mol$^{-1}$ cm$^{-1}$ or less at a wavelength of 380 to 450 nm is able to suppress discoloration of a shaped product to be obtained. Examples of such an ultraviolet absorber can include 2-ethyl-2'-ethoxy-oxalanilide (trade name: Sanduvor VSU available from Clariant (Japan) K.K.).

Among these ultraviolet absorbers, in the sight of suppressing degradation of a resin caused by ultraviolet exposure, benzotriazoles are preferably used.

To efficiently absorb a short wavelength of 380 nm or less, triazine ultraviolet absorbers are preferably used. Examples of such ultraviolet absorbers can include 2,4,6-tris(2-hydroxy-4-hexyloxy-3-methyl phenyl)-1,3,5-triazine (LA-F70 available from ADEKA CORPORATION), hydroxyphenyl triazine ultraviolet absorbers (TINUVIN477 or TINUVIN460 available from BASF SE), which are analogs thereof and the like.

The maximum molar absorptivity $\varepsilon_{max}$ of an ultraviolet absorber is measured as follows: to 1 L of cyclohexane, 10.00 mg of an ultraviolet absorber is added and dissolved so that undissolved matters are not visually observed; this solution is charged into a 1 cm×1 cm×3 cm quartz glass cell; the absorbance thereof at a wavelength of 380 to 450 nm and an optical path length of 1 cm is measured using a spectrophotometer (U-3410 available from Hitachi, Ltd.); and the maximum molar absorptivity $\varepsilon_{max}$ is calculated from the molecular weight ($M_{UV}$) of the ultraviolet absorber and the measured maximum absorbance ($A_{max}$) using a formula $\varepsilon_{max}=[A_{max}/(10\times10^{-3})]\times M_{UV}$.

A light stabilizer is a compound that is said to have a function of trapping radicals mainly generated by photooxidation. As light stabilizers, preferred are hindered amines such as compounds having a 2,2,6,6-tetraalkylpiperidine skeleton.

Examples of lubricants can include stearic acid, behenic acid, stearamide acid, methylenebisstearamide, hydroxystearic acid triglyceride, paraffin wax, ketone wax, octyl alcohol, hydrogenated oil and the like. An increase in the usage of the lubricant tends to cause an increase in the melt flow rate R and thus an increase in the flowability of the methacrylic resin composition of the present invention.

Mold release is a compound having a function of facilitating the release of a shaped product from the mold. Examples of mold release can include higher alcohols such as cetyl alcohol, stearyl alcohol and the like; glycerin higher fatty acid esters such as monoglyceride stearate, diglyceride stearate and the like. In the present invention, a higher alcohol and glyceryl fatty acid monoester are preferably used in combination as mold release. If a higher alcohol and glyceryl fatty acid monoester are used in combination, the mass ratio of the higher alcohol to the glyceryl fatty acid monoester is preferably 2.5/1 to 3.5/1, more preferably 2.8/1 to 3.2/1.

As the polymer processing aid, used may be, for example, polymer particles having a diameter of 0.05 to 0.5 μm. The polymer particles may be monolayer particles formed of a polymer having a single composition ratio and a single limiting viscosity, or may be multilayer particles formed of two or more polymers having different composition ratios or limiting viscosities. Among these, two-layer particles composed of an inner layer of a polymer with a low limiting viscosity and an outer layer of a polymer with a high limiting viscosity of 5 dl/g or more are preferred. The polymer processing aid preferably has a limiting viscosity of 3 to 6 dl/g. Specific examples of such a polymer processing aid can include METABLEN P series available from Mitsubishi Rayon Co. Ltd., and Paraloid series available from The Dow Chemical Company. The usage of the polymer processing aid is preferably 0.1 part by mass or more and 5 parts by mass or less with respect to 100 parts by mass of the methacrylic resin. If the usage of the polymer processing aid is 0.1 part by mass or more, good processing characteristics are obtained; if the usage of the polymer processing aid is 5 parts by mass or less, good surface smoothness is obtained.

Examples of impact resistance modifiers can include core-shell modifiers comprising acrylic rubber or diene rubber as a core-layer component; modifiers comprising a number of rubber particles and the like.

As organic dye, used is preferably a compound having a function of converting ultraviolet rays, believed to be hazardous to resins, into visible rays.

Examples of light diffusion agents or delustrants can include glass particles, polysiloxane crosslinked fine particles, crosslinked polymer fine particles, talc, calcium carbonate, barium sulfate and the like.

Examples of fluorescent materials can include fluorescent pigments, fluorescent dyes, fluorescent white dyes, fluorescent brighteners, fluorescent bleaches and the like.

These additives may be used alone or in combination of two or more. These additives may be added during or after production of the methacrylic resin. To suppress appearance defects of a shaped product, the total amount of additives contained in the methacrylic resin composition of the present invention is preferably 7% by mass or less, more preferably 5% by mass or less, even more preferably 4% by mass or less with respect to the methacrylic resin.

The methacrylic resin composition of the present invention may comprise a polymer other than the methacrylic resin to the extent that the effects of the present invention are not impaired. Examples of other polymers can include polyolefin resins such as polyethylene, polypropylene, polybutene-1, poly-4-methyl pentene-1, polynorbonene and the like; styrene resins such as polystyrene, styrene-maleic anhydride copolymer, high impact polystyrene, AS resin, ABS resin, AES resin, AAS resin, ACS resin, MBS resin and the like; methyl methacrylate-styrene copolymer; polyester resins such as polyethylene terephthalate, polybutylene terephthalate and the like; polyamides such as nylon 6, nylon 66, polyamide elastomer and the like; polycarbonate, polyvinyl chloride, polyvinylidene chloride, polyvinyl alcohol, ethylene-vinyl alcohol copolymer, polyacetal, polyvinylidene fluoride, polyurethane, modified-polyphenylenether, polyphenylene sulfide, silicone-modified resin and the like; acrylic rubber, silicone rubber; styrene thermoplastic elastomers such as SEPS, SEBS, SIS and the like; olefin rubber such as IR, EPR, EPDM and the like; phenoxy resins and the like. Among these, at least one selected from the group consisting of polycarbonate and phenoxy resin is preferred.

With respect to the methacrylic resin composition of the present invention, an absolute value of a difference (ΔYI) between the yellow index (YI4) at an optical path length of 200 mm of an injection molded article obtained at a cylinder temperature of 280° C. in a molding cycle of 4 minutes and the yellow index (YI2) at an optical path length of 200 mm of an injection molded article obtained at a cylinder temperature of 280° C. in a molding cycle of 2 minutes is 3 or less, preferably 2.7 or less. The yellow indexes are determined as follows: the light transmittance at an optical path length of 200 mm is measured every one nm in a wavelength range of 340 nm to 700 nm using a C illuminant; XYZ values are obtained from the measured values in accordance with a method described in JIS Z 8722; and the yellow indexes are calculated from the measured XYZ values in accordance with a method described in JIS K 7105.

With respect to the methacrylic resin composition of the present invention, a lower limit of the melt flow rate R as measured at 230° C. with a load of 3.8 kg is preferably 11 g/10 min, more preferably 15 g/10 min; a upper limit of the R is preferably 40 g/10 min; and the R is more than 0.8 times and less than 1.2 times as large as E, preferably more than 0.85 times and less than 1.15 times as large as E. The E is a value (unit: g/10 min) calculated using Formula (A):

$$E = \exp(0.17112 \times W - 0.00399 \times P + 5.09713)$$

where W represents a ratio (unit: % by mass) of acrylate monomer units to all monomer units of the methacrylic resin used in the methacrylic resin composition of the present invention; and P represents a degree of polymerization of the methacrylic resin used in the methacrylic resin composition of the present invention.

The degree of polymerization P of the methacrylic resin is a value obtained by calculating a molecular weight M from a limiting viscosity η (chloroform, 20° C.) using the Houwink-Mark-Sakurada equation [Formula (D)] and dividing the molecular weight M by the molecular weight (100 g/mol) of the methyl methacrylate.

$$\eta = 4.85 \times 10^{-5} \times M^{0.80} \tag{D}$$

$$P = M/100 \tag{E}$$

The melt flow rate is measured at 230° C. with a load of 3.8 kg for 10 min in accordance with JIS K 7210.

The range of the melt flow rate R of the methacrylic resin composition of the present invention can be represented by Formula (B) and Formula (C), preferably by Formula (B$_1$) and Formula (C$_1$).

$$E=\exp(0.17112 \times W - 0.00399 \times P + 5.09713) \quad (A)$$

$$R \geq 11 \quad (B)$$

$$R \geq 15 \quad (B_1)$$

$$0.8 < R/E < 1.2 \quad (C)$$

$$0.85 < R/E < 1.15 \quad (C_1)$$

$E=\exp (0.17112 \times W - 0.00399 \times P + 5.09713)$ is synonymous with $E=e^{(0.17112 \times W - 0.00399 \times P + 5.09713)}$ where e represents the base of a natural logarithm, that is, Napier's constant.

The Formula (A) was determined by producing many methacrylic resins usable in the present invention and statistically processing the degree of polymerization of each methacrylic resin, the ratio of the acrylate monomer units of each methacrylic resin, and data relating to the melt flow rate of each methacrylic resin. For this reason, E can be regarded as the median of the melt flow rate range in which a good injection molded article is made of a methacrylic resin having the degree of polymerization P, and the ratio of acrylate monomer units W.

If the Formula (B) is satisfied and the melt flow rate R is 11 g/10 min or more, the methacrylic resin composition of the present invention has excellent flowability. A favorable board having a thickness of 1 mm or less can be formed from such methacrylic resin composition as a preferred application of the present invention. Also, larger melt flow rate R can more suppress shear heating, injection pressure and coloring during injection molding. To obtain melt flow rate of 11 g/10 min or more, adjustment is made, for example, by increasing the amount of acrylate monomer, reducing the molecular weight, or adding a plasticizing additive such as a lubricant.

If the Formula (C) and 0.8<R/E<1.2 are satisfied, an injection-molded article having a ΔYI value of 3 or less is more likely to be obtained. If R/E≥1.2 due to, for example, excessive inclusion of a lubricant in the resin composition, stain is more likely to occur on the surface of the mold during molding.

The methacrylic resin composition of the present invention can be obtained using, for example, a melt mixing method, solution mixing method or the like. A melt mixing method can be performed using a known mixer or kneader, such as a kneader-ruder, single screw extruder, twin-screw extruder, mixing roll, Banbury mixer or the like. Among these, twin-screw extruder is preferred. The melt mixing method is preferably performed in an atmosphere of an inert gas such as nitrogen gas, argon gas, helium gas or the like. The temperature during mixing/kneading may be appropriately adjusted in accordance with the melting temperature or the like of the methacrylic resin to be used and is preferably 110° C. to 300° C. A solution mixing method may be performed using an organic solvent which can dissolve a methacrylic resin and another polymer or the like. Examples of organic solvents can include dichloromethane, tetrahydrofuran, methyl ethyl ketone or the like.

To increase convenience or the like of transportation, storage or the like, the methacrylic resin composition of the present invention may be in any form, including pellets, granules, powder or the like.

A shaped product of the present invention is obtained by molding the methacrylic resin composition of the present invention. The methacrylic resin composition of the present invention may be molded using a known method, such as injection molding, compression shape forming, extrusion shape forming, vacuum shape forming, or cast shape forming. Among these, injection molding is preferred. Even if it is injection-molded at low cylinder temperature and high injection pressure, the methacrylic resin composition of the present invention allows a nearly not colored, thin, large-area shaped product having less residual strain to be produced with high production efficiency. With respect to the methacrylic resin composition of the present invention, the maximum ratio of the resin flow length to the thickness of a mold available in injection molding is preferably 450 or more. If the maximum ratio of the resin flow length to the thickness is as high as the above range, the methacrylic resin composition of the present invention is suitable to produce a thin shaped product. A preferred shaped product of the present invention is a plate having a thickness of preferably 1 mm or less, more preferably 0.5 mm or less, even more preferably 0.45 mm or less, particularly preferably 0.4 mm or less.

The methacrylic resin composition of the present invention can be used to produce various types of shaped products. Examples of shaped products can include parts of signs such as advertising towers, sign stands, side signboards, transom signs, rooftop signs and the like; parts of displays such as showcases, partition boards, store displays and the like; parts of lighting fixtures such as fluorescent lamp covers, mood lighting covers, lampshades, luminous ceilings, light walls, chandeliers and the like; parts of interior goods such as pendants, mirrors and the like; parts of building materials such as doors, domes, safety window glass, partitions, staircase baseboards, balcony baseboards, roofs of leisure buildings and the like; transportation-related parts such as aircraft windshields, pilot visors, motorcycle/motorboat windshields, shading boards for buses, side visors for automobiles, rear visors, head wings, headlight covers and the like; electronic device parts such as nameplates for audiovisuals, stereo covers, television protection masks, vending machine parts and the like; medical device parts such as incubators, x-ray machine parts and the like; apparatus-related parts such as machine covers, instrument covers, experiment devices, rulers, dials, observation windows and the like; optics-related parts such as liquid crystal protection boards, light guide plates, light guide films, Fresnel lenses, lenticular lenses, display front boards, diffuser panels, polarizer protection films, polarizing plate protection films, phase difference films and the like; traffic-related parts such as road signs, guide boards, traffic mirrors, sound-proof walls and the like; film members such as surface members for car interior, surface members for mobile phones, marking films and the like; home electrical appliance parts such as lid materials or control panels of washers, top panels of rice cookers and the like; and others such as greenhouses, large water tanks, box water tanks, clock panels, bathtubs, sanitary goods, desk mats, game parts, toys, face protection masks for soldering and the like. Among these, optical members are preferred applications of the methacrylic resin composition of the present invention. Among optical members, light guide plates are more preferred applications thereof.

A light guide plate is used, for example, as one member of the backlight of a liquid crystal display device and can guide light from light source on its side or in its rear to the entire plate surface to emit light uniformly. Light guide plates can have the surfaces provided with micron-size recesses and protrusions for emitting light uniformly. Use of the methacrylic resin composition of the present invention allows a thin (1 mm or less), large-area light guide plate to be produced, as well as allows a minute shape for micron-size recesses and protrusions inscribed on a mold stamper to be reproduced faithfully.

EXAMPLES

Next, the present invention will be described in more detail using Examples. However, the present invention is not limited to Examples.

Physical properties and the like were measured using the following method.

Degree of Polymerization P of Methacrylic Resin

Resin pellets were dissolved in chloroform, and the limiting viscosity η at 20° C. was measured. The molecular weight M was calculated from the limiting viscosity η on the basis of the Houwink-Mark-Sakurada formula [Formula (D)]. A value obtained by dividing the molecular weight M by the molecular weight (100 g/mol) of methyl methacrylate was defined as the degree of polymerization P.

$$\eta = 4.85 \times 10-5 \times M \qquad \text{Formula (D)}$$

$$P = M/100 \qquad \text{Formula (E)}$$

Ratio W of Methyl Acrylate (MA) Units to all Monomer Units

In 40 ml of dichloromethane, 1 g of resin pellets was dissolved, and 25 μl of the resulting solution was served on a platinum board. Dichloromethane was removed, and measurement was carried out using pyrolysis gas chromatography under the following conditions. The ratio W of MA units was calculated on the basis of the measurement results.
Instrument: GC-14A available from SHIMADZU CORPORATION
Pyrolysis reactor temperature: 500° C.
Column: SGE BPX-5
Temperature conditions: held at 40° C. for 5 min→heated to 280° C. at 5° C./min

Polymerization Conversion Ratio, Residual Volatile Component

A column [INERTCAP 1 (df=0.4 μm, 0.25 mmI.D.×60 m) available from GL Sciences Inc.] was connected to the gas chromatograph (GC-14A available from SHIMADZU CORPORATION), and assay was conducted under the following conditions. The polymerization conversion ratio and residual volatile component were calculated on the basis of the results.
Injection temperature=250° C.
Detector temperature=250° C.
Temperature conditions: held at 60° C. for 5 min→heated to 250° C. at 10° C./min→held at 250° C. for 10 min

Molecular Weight Distribution (Mw/Mn)

The molecular weight distribution was obtained from a standard polymethyl methacrylate-converted molecular weight by gel permeation chromatography (GPC).
Instrument: GPC instrument HLC-8320 available from TOSOH CORPORATION
Separation column: TSKguardcolumSuperHZ-H, TSKgelHZM-M, and TSKgelSuperHZ4000 available from TOSOH CORPORATION connected in series
Eluent: tetrahydrofuran
Eluent flow rate: 0.35 ml/min
Column Temperature: 40° C.
Detection method: differential refractive index (RI)

Melt Flow Rate R

The melt flow rate was determined at 230° C. under a load of 3.8 kg for 10 min in accordance with JIS K 7210.

Yellow Index Difference ΔYI

Injection molding was performed using an injection molding machine (J-110 EL III available from The Japan Steel Works, LTD.) at a cylinder temperature of 280° C. and a mold temperature of 60° C. in two molding cycles of 2 minutes and 4 minutes to give 200 mm-long, 60 mm-wide and 6 mm-thick flat boards.

The yellow index of each of the obtained flat boards was determined under the following conditions. The light transmittance at an optical path length of 200 mm was measured every nm in a wavelength range of 340 nm to 700 nm using a spectrophotometer (PC-2200 available from SHIMADZU CORPORATION) and a C illuminant. The XYZ values were obtained from the measurement value in accordance with a method described in JIS Z 8722, and the yellow index (YI) was calculated in accordance with a method described in JIS K 7105. The difference (ΔYI) was calculated between the yellow index (YI4) obtained in the molding cycle of 4 minutes and the yellow index (YI2) obtained in the molding cycle of 2 minutes.

Injection Moldability

Injection molding was performed at a cylinder temperature of 280° C. and a mold temperature of 75° C. in a molding cycle of 1 minute using an injection molding machine (SE-180DU-HP available from Sumitomo Heavy Industries, Ltd.) to produce a 205 mm-long side, 160 mm-short side and 0.4 mm-thick flat board S. With respect to the flat board S, the ratio of the resin flow length from the gate relative to the thickness was 475 (=190 mm/0.4 mm).
The appearance of the flat board S was observed and evaluated using the following indexes:
◯: no crack nor sink mark was present.
Δ: sink marks were present.
x: cracks were present.

Mold Stain

Forty shots of injection molding were performed at a molding temperature of 260° C. and a mold temperature of 60° C. in a molding cycle of 26 seconds without dwelling (short shot) using an injection molding machine (M-100c available from Meiki Co., Ltd.) and a flat mold (shaped product sizes: 40 mm×200 mm×2 mm). The mold surface was checked for stain and evaluated using the following indexes:
◯: mold stain was not present.
x: mold stain was present.

Flowability

Injection molding was performed at a mold closing pressure of 180 tons, a screw diameter of φ 36 mm, a mold temperature of 80° C., a molding temperature 285° C., an injection speed of 400 mm/s, and a filling pressure of 274 MPa using a molding machine (SE-180DU-HP available from Sumitomo Heavy Industries, Ltd.) and a spiral flow mold (product thickness 0.4 mm, width 10 mm). The then spiral flow length was measured, and the flowability was evaluated using the following indexes:

◯: 175 mm or more
x: less than 175 mm

EXAMPLES 1 TO 4 AND COMPARATIVE EXAMPLES 1 TO 8

Purified methyl methacrylate (MMA), methyl acrylate (MA), 2,2'-azobis(2-methylpropionitrile) (AIBN), and n-octyl mercaptan (n-OM) were charged into a stirrer-equipped autoclave A at ratios described in Tables 1 and 2 and dissolved uniformly to obtain starting material liquids (I).

The starting material liquid (I) was fed from the autoclave A to a tank reactor whose temperature was controlled to 140° C., at 1.5 kg/hr. Bulk polymerization was performed for a mean residence time of 120 minutes, and the reaction solution containing a polymer was continuously discharged from the tank reactor. The polymerization conversion ratio of the obtained polymer was 57% by mass.

Then, the reaction solution was heated to 230° C. and fed to a twin-screw extruder whose temperature was controlled to 240° C. A volatile component containing unreacted monomers as a main component was separated and removed in the twin-screw extruder, and the polymer was extruded as a strand. The strand is cut using a pelletizer to give resin pellets. With respect to the resin pellets, the weight average molecular weight Mw, the molecular weight distribution Mw/Mn, the ratio W of MA units, the degree of polymerization P, the melt flow rate R, and the yellow index difference ΔYI were measured. Also, the resin pellets were evaluated for injection moldability, flowability, and mold stain. The evaluation results are shown in Tables 1 and 2.

COMPARATIVE EXAMPLE 9

Purified methyl methacrylate, methyl acrylate, 2,2'-azobis (2-methylpropionitrile), and n-octyl mercaptan were charged into a stirrer-equipped autoclave A at a ratio described in Table 2 and dissolved uniformly to obtain a starting material liquid (I).

Also, 2,2'-azobis (2-methylpropionitrile) and n-octyl mercaptan were charged into an autoclave B at a ratio described in Table 2 and dissolved with a slight amount of methyl methacrylate to obtain a starting material liquid (II).

The starting material liquid (I) was fed to a first tank reactor whose temperature was controlled to 140° C., at 1.5 kg/hr, and bulk polymerization was performed for a mean residence time of 90 minutes. A reaction solution (a) containing a polymer was continuously discharged from the first tank reactor at 1.5 kg/hr. The polymerization conversion ratio of the obtained polymer was 35% by mass, and the degree of polymerization was 870.

The reaction solution (a) held at 140° C. and starting material liquid (II) were mixed and fed to a second tank reactor whose temperature was controlled to 140° C., at 1.5 kg/hr. Bulk polymerization was performed for a mean residence time of 90 minutes, and the reaction solution (b) containing a polymer was discharged from the second tank reactor at 1.5 kg/hr. The polymerization conversion ratio of the obtained polymer was 57% by mass.

Then, the reaction solution (b) was heated to 230° C. and fed to a twin-screw extruder whose temperature was controlled to 240° C. A volatile component containing unreacted monomers as a main component was separated and removed in the twin-screw extruder, and a polymer was extruded as a strand. The strand is cut using a pelletizer to give resin pellets. With respect to the resin pellets, the weight-average molecular weight Mw, the molecular weight distribution Mw/Mn, the ratio W of MA units, the degree of polymerization P, the melt flow rate R, and the yellow index

TABLE 1

|  | Ex. | | | | Comp. Ex. | | |
| --- | --- | --- | --- | --- | --- | --- | --- |
|  | 1 | 2 | 3 | 4 | 1 | 2 | 3 |
| Starting material liq.(I) | | | | | | | |
| MMA [parts by mass] | 94.2 | 94.2 | 96.0 | 96.0 | 92.8 | 92.8 | 92.8 |
| MA [parts by mass] | 5.8 | 5.8 | 4.0 | 4.0 | 7.2 | 7.2 | 7.2 |
| n-OM [part by mass] | 0.43 | 0.54 | 0.56 | 0.40 | 0.62 | 0.43 | 0.36 |
| AIBN [part by mass] | 0.006 | 0.006 | 0.006 | 0.006 | 0.006 | 0.006 | 0.006 |
| methacryic resin properties | | | | | | | |
| Mw | 73000 | 60000 | 58000 | 78000 | 53000 | 73000 | 85000 |
| Mw/Mn | 1.8 | 1.8 | 1.8 | 1.8 | 1.8 | 1.8 | 1.8 |
| W [% by mass] | 4.4 | 4.4 | 3.0 | 3.0 | 5.5 | 5.5 | 5.5 |
| P | 750 | 620 | 600 | 800 | 550 | 750 | 870 |
| E [g/10 min] *[1] | 17.4 | 29.3 | 24.9 | 11.2 | 46.7 | 21.0 | 13.0 |
| methacrylic resin composition properties | | | | | | | |
| R [g/10 min] | 15.0 | 33.0 | 27.0 | 12.0 | 51.0 | 20.0 | 14.0 |
| R/E | 0.86 | 1.13 | 1.08 | 1.07 | 1.09 | 0.95 | 1.07 |
| ΔYI | 2.4 | 2.6 | 2.7 | 2.8 | 3.5 | 3.7 | 3.6 |
| shaped product evaluation | | | | | | | |
| injection moldability | ◯ | ◯ | ◯ | ◯ | x | ◯ | ◯ |
| mold stain | ◯ | ◯ | ◯ | ◯ | ◯ | ◯ | ◯ |
| flowability | ◯ | ◯ | ◯ | ◯ | ◯ | ◯ | ◯ |

*[1] $E = \exp(0.17112 \times W - 0.00399 \times P + 5.09713)$ difference ΔYI were measured. Also, the resin pellets were evaluated for injection molding, flowability, and mold stain. The results are shown in Table 2.

COMPARATIVE EXAMPLE 10

Resin pellets were obtained in the same manner as in Example 1 except that when separating and removing a volatile component containing unreacted monomers as a main component in the twin-screw extruder and extruding a polymer as a strand, 0.40 part by mass of stearyl alcohol and 0.10 part by mass of stearic acid monoglyceride were added to 100 parts by mass of the polymer. With respect to the resin pellets, the weight-average molecular weight Mw, the molecular weight distribution Mw/Mn, the ratio W of MA units, the degree of polymerization P, the melt flow rate R, and the yellow index difference ΔYI were measured. Also, the resin pellets were evaluated for injection moldability, flowability, and mold stain. The results are shown in Table 2.

TABLE 2

| | Comp. Ex. | | | | | | |
|---|---|---|---|---|---|---|---|
| | 4 | 5 | 6 | 7 | 8 | 9 | 10 |
| Starting material liq.(I) | | | | | | | |
| MMA [parts by mass] | 94.2 | 96.0 | 96.0 | 94.2 | 94.2 | 94.2 | 94.2 |
| MA [parts by mass] | 5.8 | 4.0 | 4.0 | 5.8 | 5.8 | 5.8 | 5.8 |
| n-OM [part by mass] | 0.62 | 0.62 | 0.35 | 0.33 | 0.36 | 0.36 | 0.54 |
| AIBN [part by mass] | 0.006 | 0.006 | 0.006 | 0.006 | 0.006 | 0.004 | 0.006 |
| Starting material liq.(II) | | | | | | | |
| n-OM [part by mass] | | | | | | 0.7 | |
| AIBN [part by mass] | | | | | | 0.002 | |
| methacrylic resin properties | | | | | | | |
| Mw | 53000 | 53000 | 88000 | 93000 | 85000 | 71000 | 60000 |
| Mw/Mn | 1.8 | 1.8 | 1.8 | 1.8 | 1.8 | 2.1 | 1.8 |
| W [% by mass] | 4.4 | 3.0 | 3.0 | 4.4 | 4.4 | 4.4 | 4.4 |
| P | 550 | 550 | 900 | 950 | 870 | 730 | 620 |
| E [g/10 min] *[1] | 38.7 | 30.4 | 7.5 | 7.8 | 10.8 | 18.9 | 29.3 |
| methacrylic resin composition properties | | | | | | | |
| R [g/10 min] | 42.0 | 32.0 | 7.0 | 7.9 | 10.0 | 32.0 | 36.0 |
| R/E | 1.09 | 1.05 | 0.93 | 1.01 | 0.93 | 1.70 | 1.23 |
| ΔYI | 2.3 | 2.3 | 2.9 | 2.5 | 2.6 | 3.0 | 2.9 |
| shaped product evaluation | | | | | | | |
| injection moldability | x | x | Δ | Δ | ○ | x | ○ |
| mold stain | ○ | ○ | ○ | ○ | ○ | ○ | x |
| flowability | ○ | ○ | x | x | x | ○ | ○ |

*[1] $E = \exp(0.17112 \times W - 0.00399 \times P + 5.09713)$

The resin compositions obtained in Examples 1 to 4 had high flowability, excellent injection moldability, and no mold stain. As a result, the shaped products obtained in Examples 1 to 4 were excellent in transparency, heat resistance, mechanical strength, appearance, and the like. On the other hand, the resin compositions obtained in Comparative Examples 1 to 10 had low flowability, or poor injection moldability, or mold stain. As a result, with respect to the shaped products obtained in Comparative Examples 1 to 10, at least one of heat resistance, mechanical strength, appearance, and the like was poor.

The invention claimed is:

1. A methacrylic resin composition, comprising not less than 90% by mass of a methacrylic resin, wherein the methacrylic resin comprises 94.2 to 98% by mass of methyl methacrylate monomer units and 2 to 5.8% by mass of acrylate monomer units, the methacrylic resin has an Mw of 57000 to 90000, Mw representing a weight-average molecular weight, and a ratio Mw/Mn of not more than 1.9, Mn representing a number-average molecular weight, and the methacrylic resin composition has an absolute value of a difference between YI4 and YI2 of not more than 3, YI4 representing a yellow index at an optical path length of 200 mm of an injection-molded article obtained at a cylinder temperature of 280° C. in a molding cycle of 4 minutes, YI2 representing a yellow index at an optical path length of 200 mm of an injection-molded article obtained at a cylinder temperature of 280° C. in a molding cycle of 2 minutes, and meets a relationship represented by Formula (B) and Formula (C):

$$R \geq 11 \qquad \text{Formula (B)}$$

$$0.8 < R/E < 1.2 \qquad \text{Formula (C)}$$

where R represents the melt flow rate of the methacrylic resin composition as measured at 230° C. under a load of 3.8 kg, the melt flow rate R being expressed in g/10 min; and E represents a value calculated by Formula (A), the value E being expressed in g/10 min, the Formula (A) being $E = \exp(0.17112 \times W - 0.00399 \times P + 5.09713)$ where W represents the ratio of acrylate monomer units to the total monomer units in the methacrylic resin, the ratio W being expressed in % by mass; and P represents the degree of polymerization of the methacrylic resin.

2. An injection-molded article, composed of the methacrylic resin composition according to claim 1.

3. A board, composed of the methacrylic resin composition according to claim 1 and having a thickness of not more than 1 mm.

4. A method for producing the methacrylic resin composition according to claim 1, the method comprising bulk-polymerizing a monomer mixture comprising methyl methacrylate monomer and an acrylate monomer.

5. A method for producing an injection-molded article, the method comprising injection-molding a methacrylic resin composition, wherein
    the methacrylic resin composition comprises not less than 90% by mass of a methacrylic resin,
    the methacrylic resin comprises 94.2 to 98% by mass of methyl methacrylate monomer units and 2 to 5.8% by mass of acrylate monomer units,
    the methacrylic resin has an Mw of 57000 to 90000, Mw representing a weight-average molecular weight, and a ratio Mw/Mn of not more than 1.9, Mn representing a number-average molecular weight, and
    the methacrylic resin composition has an absolute value of a difference between YI4 and YI2 of not more than 3, YI4 representing a yellow index at an optical path length of 200 mm of an injection-molded article obtained at a cylinder temperature of 280° C. in a molding cycle of 4 minutes, YI2 representing a yellow index at an optical path length of 200 mm of an injection-molded article obtained at a cylinder temperature of 280° C. in a molding cycle of 2 minutes, and meets a relationship represented by Formula (B) and Formula (C):

$$R \geq 11 \quad \text{Formula (B)}$$

$$0.8 < R/E < 1.2 \quad \text{Formula (C)}$$

where R represents the melt flow rate of the methacrylic resin composition as measured at 230° C. under a load of 3.8 kg, the melt flow rate R being expressed in g/10 min; and E represents a value calculated by Formula (A), the value E being expressed in g/10 min, Formula (A) being $E = \exp(0.17112 \times W - 0.00399 \times P + 5.09713)$ where W represents the ratio of acrylate monomer units to the total monomer units in the methacrylic resin, the ratio W being expressed in % by mass; and P represents the degree of polymerization of the methacrylic resin.

6. The methacrylic resin composition according to claim 1, wherein the methacrylic resin comprises 95 to 98% by mass of methyl methacrylate monomer units and 2 to 5% by mass of acrylate monomer units.

7. The method according to claim 5, wherein the methacrylic resin comprises 95 to 98% by mass of methyl methacrylate monomer units and 2 to 5% by mass of acrylate monomer units.

* * * * *